3,228,923
PREPARATION OF POLYMERS
Charles E. Scott, Drexel Hill, and Wesley R. Cherry, Prospect Park, Pa., assignors to Sun Oil Company, Philadelphia, Pa., a corporation of New Jersey
No Drawing. Filed Feb. 1, 1961, Ser. No. 86,275
4 Claims. (Cl. 260—91.1)

This invention relates to the preparation of polymers from vinyl alkyl ethers.

It is known in the art to polymerize vinyl alkyl ethers utilizing a Friedel-Crafts type catalyst such as $AlCl_3$, $BF_3$ or the like. Generally this type of catalyst causes a highly vigorous reaction to occur, which results in difficulties in effecting smooth control. For example, vinyl alkyl ethers often react violently under the influence of Friedel-Crafts catalysts and polymers are usually obtained which have poor color or poor color stability.

It has now been discovered that zeolitic molecular sieve adsorbents will function as catalysts for polymerizing these types of compounds and that the polymerization reaction is easily controllable. Products which are of light color or essentially water white and which have good color stability can readily be prepared by utilizing the zeolitic catalysts. This type of catalyst is also advantageous in that it can be separated readily from the reaction products.

The zeolitic molecular sieve adsorbents used as catalysts in the present process are known in the art and have been employed heretofore for effecting physical separations of various types of compounds from others. They can be either naturally occurring or synthetically prepared zeolites. They vary to an extent in composition but generally contain silica, aluminum, oxygen and an alkali or alkaline earth metal or both. They are characterized by having uniform pore sizes which can vary from one zeolitic adsorbent to another; but this characteristic plays no part in the catalytic use of this material, as they will function suitably for the present purpose regardless of the particular pore size involved. Molecular sieves which are largely sodium zeolites are preferred for use in the present process. For a discussion of molecular sieve adsorbents, reference can be had to United States Patent No. 2,904,507.

Vinyl alkyl ethers which are polymerized according to the invention have the generic formula $H_2C=CH—O—R$ wherein R is an alkyl group having 1–20 carbon atoms. Examples of such monomers are methyl vinyl ether, ethyl vinyl ether, n-propyl vinyl ether, isobutyl vinyl ether, isooctyl vinyl ethers, stearyl vinyl ether and the like.

The invention can be carried out merely by contacting one or a mixture of any of the above-defined compounds with zeolitic molecular sieve adsorbent at a temperature in the range of —70° to 150° C. for a time sufficient to effect substantial polymerization. The molecular weight of the product can vary considerably such that the products are viscous oils, sticky semi-solids or hard solids, depending upon the reaction temperature used and the time allowed for the reaction. Lower reaction temperatures tend to produce higher molecular weight products. The reaction time can vary considerably, for example, from five minutes to five days. The reaction can be conducted either with or without a solvent. In cases where highly viscous or solid products are to be prepared, it is often desirable to utilize a solvent to prevent the reaction mixture from becoming too viscous or to prevent precipitation of the product as a separate phase. Examples of solvents which can be employed are halohydrocarbons such as dichloromethane, chloroform, carbon tetrachloride and 1,2-dibromoethane, aliphatic hydrocarbons, such as hexanes, heptanes, and octanes, and aromatic hydrocarbons such as benzene, toluene and xylenes. The reaction can be conducted batchwise or continuously by flowing the reactant through a bed of the catalyst.

After the reaction has been completed, the polymer can be recovered from the reaction mixture by evaporating the solvent if one has been used and also any unreacted monomer, or by precipitation from the mixture by adding an anti-solvent such as methanol, filtering or decanting and then vacuum drying. The resulting polymer will be a clear viscous liquid, a gummy semi-solid or a light solid depending upon the starting monomer and the reaction conditions used. These products are useful for various applications such as adhesives, lubricating oil modifiers, paint and lacquer resins, molding resins, coatings, plasticizers or modifiers for alkyd, polystyrene or nitrocellulose resins and plastics, and the like.

The following example is illustrative of the invention:

*Example*

A sodium zeolite molecular sieve adsorbent, known commercially as Linde 5A molecular sieves, was dried in an oven for 3 hours at 600° F., and then 15 g. of the adsorbent were mixed with 200 ml. of freshly distilled vinyl isobutyl ether. The mixture was stirred under an atmosphere of nitrogen for 18 hours at room temperature. During this time the viscosity of the mixture increased considerably. Methyl alcohol was then poured into the mixture to cause precipitation of polymer and the alcohol layer was decanted from the polymer layer. The polymer was vacuum dried at 50° C. The product, which amounted to 5.3 g., was a colorless sticky semi-solid having an intrinsic viscosity in toluene at 25° C. of 0.29. This product was particularly useful as an adhesive.

When any of the other above-defined vinyl alkyl ethers are substituted for those used in the foregoing example, substantially analogous results are obtained. The invention can also be used for making copolymers from mixed vinyl alkyl ethers.

We claim:

1. Method for controllably polymerizing a vinyl alkyl ether having the formula $H_2C=CH—O—R$ wherein R is an alkyl radical having 1–20 carbon atoms which comprises contacting said ether with a zeolitic molecular sieve adsorbent at a temperature in the range of —70° to 150° C. and recovering polymer from the reaction mixture.

2. Method according to claim 1 wherein said ether is vinyl isobutyl ether.

3. Method according to claim 2 wherein said adsorbent is a sodium zeolite.

4. Method according to claim 1 wherein said adsorbent is a sodium zeolite.

References Cited by the Examiner

UNITED STATES PATENTS

| 2,197,861 | 4/1940 | Hyman | 260—80 |
| 2,593,417 | 4/1952 | D'Alelio | 260—80 |
| 3,033,778 | 5/1962 | Frilette | 260—682 |
| 3,131,171 | 4/1964 | Calfee | 260—93.5 |

OTHER REFERENCES

Schildknecht, Industrial and Engineering Chemistry, vol. 41, No. 12, pages 2891–2896 (1949).

The Merk Index, 6th ed. (1952), page 1017 under "Zeolite."

JOSEPH L. SCHOFER, *Primary Examiner.*

H. N. BURSTEIN, J. R. LIBERMAN, *Examiners.*